US009789855B2

(12) United States Patent
Welsh

(10) Patent No.: US 9,789,855 B2
(45) Date of Patent: Oct. 17, 2017

(54) DRIVE-THROUGH SPRAYER WASH

(71) Applicant: Neil Welsh, Williamsburg, IA (US)

(72) Inventor: Neil Welsh, Williamsburg, IA (US)

( * ) Notice: Subject to any disclaimer, the term of this patent is extended or adjusted under 35 U.S.C. 154(b) by 108 days.

(21) Appl. No.: 14/692,433

(22) Filed: Apr. 21, 2015

(65) Prior Publication Data

US 2016/0310997 A1    Oct. 27, 2016

(51) Int. Cl.
*B08B 3/00* (2006.01)
*B60S 3/04* (2006.01)
*B08B 3/02* (2006.01)

(52) U.S. Cl.
CPC ............... *B60S 3/04* (2013.01); *B08B 3/022* (2013.01)

(58) Field of Classification Search
CPC ........ B08B 2203/02; B08B 3/022; B60S 3/04
USPC ..................... 134/198, 104.2, 123
See application file for complete search history.

(56) References Cited

U.S. PATENT DOCUMENTS

| 5,280,855 A | 1/1994 | Rietsch, Jr. |
| 2002/0112748 A1* | 8/2002 | Niland ............ B08B 3/02 134/58 R |

* cited by examiner

*Primary Examiner* — Eric Golightly
(74) *Attorney, Agent, or Firm* — Goodhue, Coleman & Owens, P.C.

(57) ABSTRACT

An improved vehicle washing apparatus includes a plurality of upright tower sections. Each of the upright tower sections has a plurality of elongated tubular members. A horizontal section having a plurality of elongated tubular members connects the upright tower sections. At least two of the elongated tubular members of the upright tower sections and the horizontal section are configured to be conduits of liquid to supply liquid to a plurality of nozzles disposed on at least two of the elongated tubular members of each of the upright tower sections and the horizontal section. An undercarriage apparatus may apply liquid to the underside of the agricultural vehicle. A chemical fill station may be provided along with a loading pad on which to position the agricultural vehicle during a cleaning process and a chemical fill process.

16 Claims, 13 Drawing Sheets

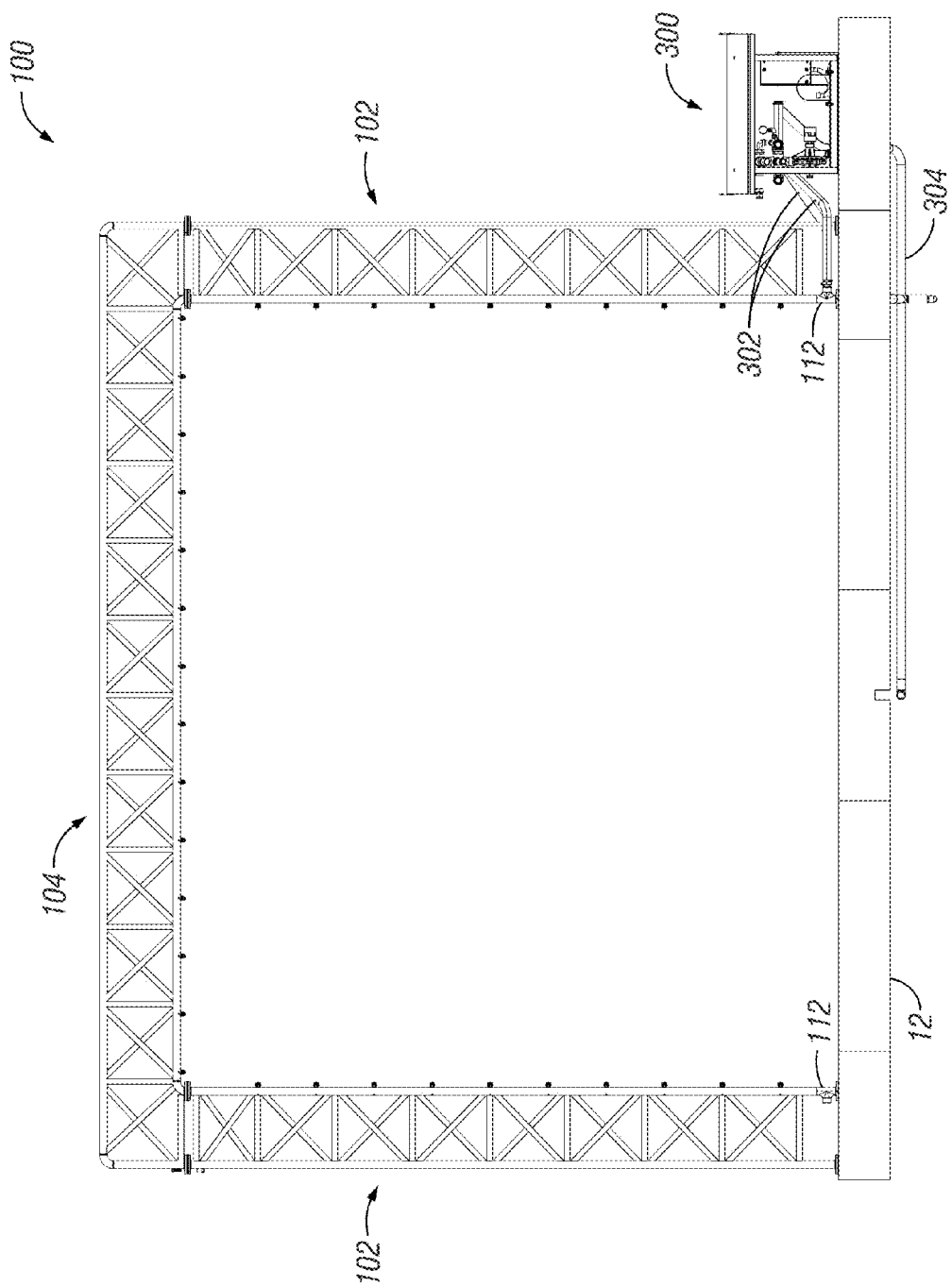

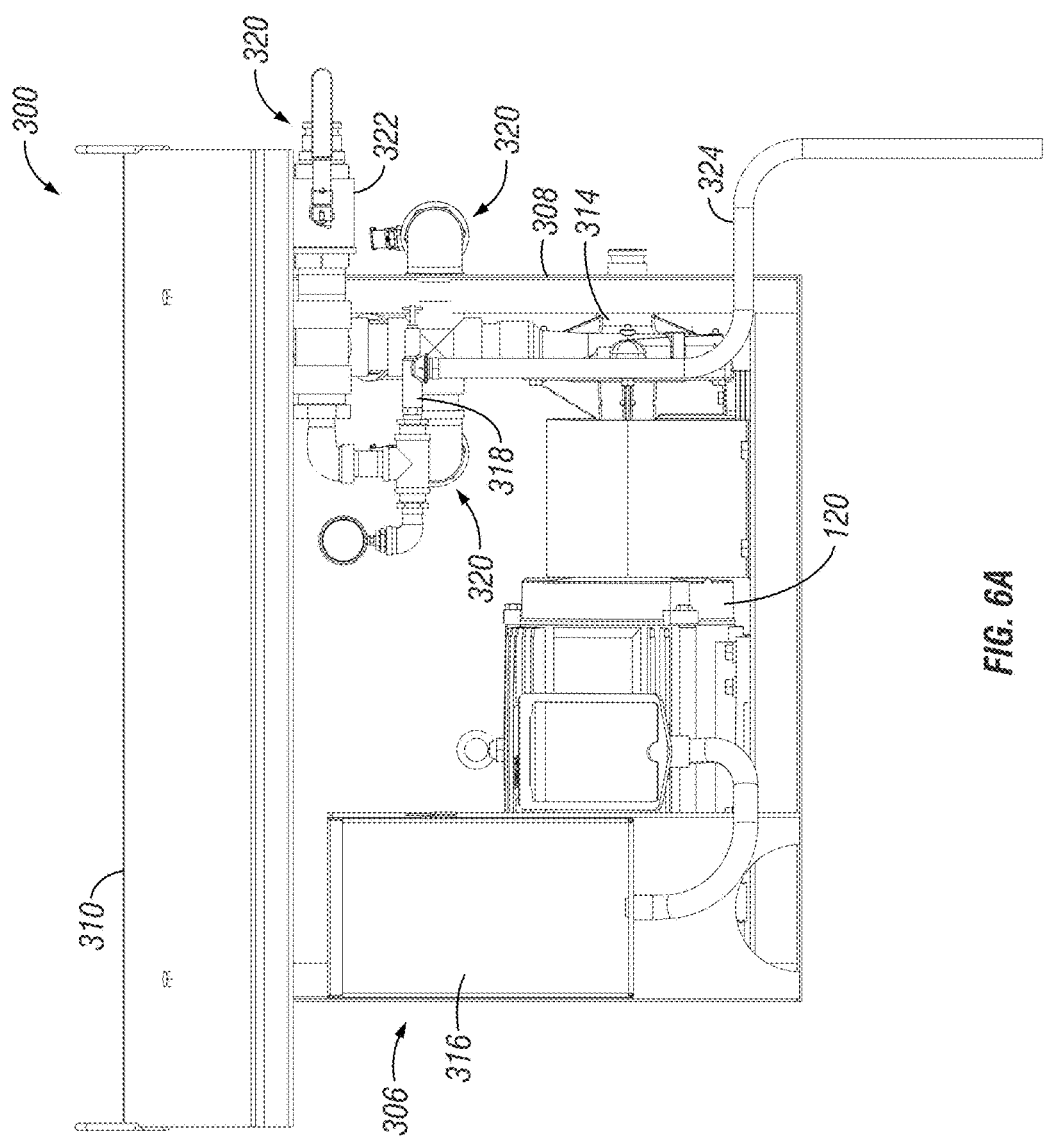

DRIVE-THROUGH SPRAYER WASH

FIELD OF THE DISCLOSURE

The present disclosure relates generally to vehicle washing. More particularly, but not exclusively, the present disclosure relates to a spray-powered washing and filling station for agricultural chemical application equipment.

BACKGROUND OF THE DISCLOSURE

During operation, all outdoor vehicles become soiled to some extent through collection of dust, debris, grime, and the like. In particular, agricultural vehicles, such as chemical application equipment, often become coated with residue from dispensed chemicals. The chemicals may be corrosive in nature, which requires the chemical sprayer to be washed frequently, often daily, to prevent accelerated deterioration of the vehicle. One common washing method is through a power washer having a hand-controlled sprayer. The method is cumbersome and time consuming, often requiring upwards of three hours to thoroughly rinse the chemical sprayer. Further, the high pressure liquid may uncontrollably deflect off of the chemical sprayer, undesirably exposing an individual to harmful chemicals. The prolonged exposure may have deleterious effects on the individual's health. Therefore, a need exists in the art for an improved method for removing undesirable residue from a vehicle that requires less time and manual labor. Further, a need exists in the art for an improved method of washing vehicles that minimizes exposure to chemicals.

Often, chemicals are loaded into chemical application equipment in the same location it is washed. In many instances, the location is near a well, surface water supply, or drainageway. Doing so increases the risk of introducing the chemicals in the water supply and harming water and land resources, people and animals. In fact, most water pollution cases due to agrichemicals are the result of improper material handling and spills occurring during the loading, unloading, and/or cleaning of chemical sprayers. Because of the potential for contamination of soil and water resources, a further need exists in the art for an improved method to load and wash chemical application equipment in the same location.

SUMMARY OF THE DISCLOSURE

It is therefore a primary object, feature, and/or advantage of the present disclosure to improve on or overcome the deficiencies in the art.

It is another object, feature, and/or advantage of the present disclosure to provide a location for both filling and rinsing of chemical application equipment. The combined location advantageously minimizes undesirable environmental exposure to chemicals through a common collection area for liquid and chemical residue runoff.

It is yet another object, feature, and/or advantage of the present disclosure to remove undesirable residue from a vehicle that requires less time and manual labor.

It is still yet another object, feature, and/or advantage of the present disclosure provide a vehicle washing apparatus wherein load-bearing members are also part of the fluid delivery system, resulting in simplified structure.

It is another object, feature, and/or advantage of the present disclosure to provide upright towers with the same design, thereby providing a modular and interchangeable system. The interchangeability reduces component costs, manufacturing time and costs, repair time and costs, and the like.

These and/or other objects, features, and advantages of the present disclosure will be apparent to those skilled in the art. The present disclosure is not to be limited to or by these objects, features and advantages. No single embodiment need provide each and every object, feature, or advantage.

According to an aspect of the disclosure, a system of washing an agricultural vehicle includes a loading pad on which to position the agricultural vehicle during a cleaning process and a chemical fill process. A chemical fill station is associated with the loading pad. The chemical fill station has a reservoir for storing and dispensing one or more chemicals to the agricultural vehicle during the chemical fill process. A spray washing apparatus disposed on the loading pad. The spray washing apparatus is configured to supply water from a water reservoir to the agricultural vehicle during the cleaning process. The spray washing apparatus comprises a plurality of upright towers, a horizontal tower, and a plurality of nozzles. At least two vertical members comprising each of the upright towers and the horizontal tower are a fluid conduit in fluid connection with the water reservoir. The nozzles are disposed on the upright towers and the horizontal tower. The nozzles may be arranged linearly along a length of the vertical members of each the plurality of upright towers also being fluid conduits. The nozzles may create an intersecting spray pattern. The system may further include an undercarriage washing apparatus in fluid connection with the water reservoir and configured to apply water from the water reservoir to an underside of the agricultural vehicle.

According to another aspect of the disclosure, a vehicle washing apparatus is provided. The apparatus includes a first upright tower section and a second upright tower section. Each of the first upright tower section and the second upright tower section has a plurality of elongated tubular members. The apparatus further includes a horizontal section connecting the first upright tower section and the second upright tower section. The horizontal section has a plurality of elongated tubular members. A plurality of nozzles is disposed on at least two of the elongated tubular members of the first upright tower section, at least two of the elongated tubular members of the second upright tower section, and at least two of the elongated tubular members of the horizontal section. The nozzles are in fluid connection with a liquid reservoir. At least two of the elongated tubular members of the first upright tower section, the second upright tower section, and the horizontal section are configured to be conduits of liquid and to supply the liquid from the reservoir to the nozzles. A control system may be configured to control a section of valves and/or each valve associated with a nozzle. The horizontal section may be detachable from the first upright tower section and/or second upright tower section. The first tower section and the second tower section may be interchangeable.

According to yet another aspect of the disclosure, a method of servicing an agricultural sprayer vehicle includes the step of providing a chemical fill pad having a sump and a chemical reservoir, and a spray washer associated with the chemical fill pad. The spray washer includes a water reservoir, a plurality of upright towers, a horizontal tower connecting the upright towers, and a plurality of nozzles on the upright towers and the horizontal tower. At least two vertical members comprising each of the upright towers and the horizontal tower are a conduit in fluid connection with the water reservoir. The nozzles are in fluid connection with the chemical reservoir. The method includes the step of filling the agricultural sprayer vehicle with chemical product from the chemical reservoir. Water is supplied from the water reservoir to the agricultural sprayer vehicle. Runoff water is collected with the sump of the chemical fill pad. The runoff water may be recycled into the spray washer. An undercarriage washer having a plurality of nozzles may be provided in fluid connection with the water reservoir. Water may be supplied from the water reservoir to the undercarriage of the agricultural sprayer vehicle.

BRIEF DESCRIPTION OF THE DRAWINGS

Illustrated embodiments of the disclosure are described in detail below with reference to the attached drawing figures, which are incorporated by reference herein, and where:

FIG. 2B is a front elevation view of a vehicle washing apparatus in accordance with an illustrative embodiment;

FIG. 6A is a front elevation view of a motor-pump shed in accordance with an illustrative embodiment;

DETAILED DESCRIPTION

Figure 1:
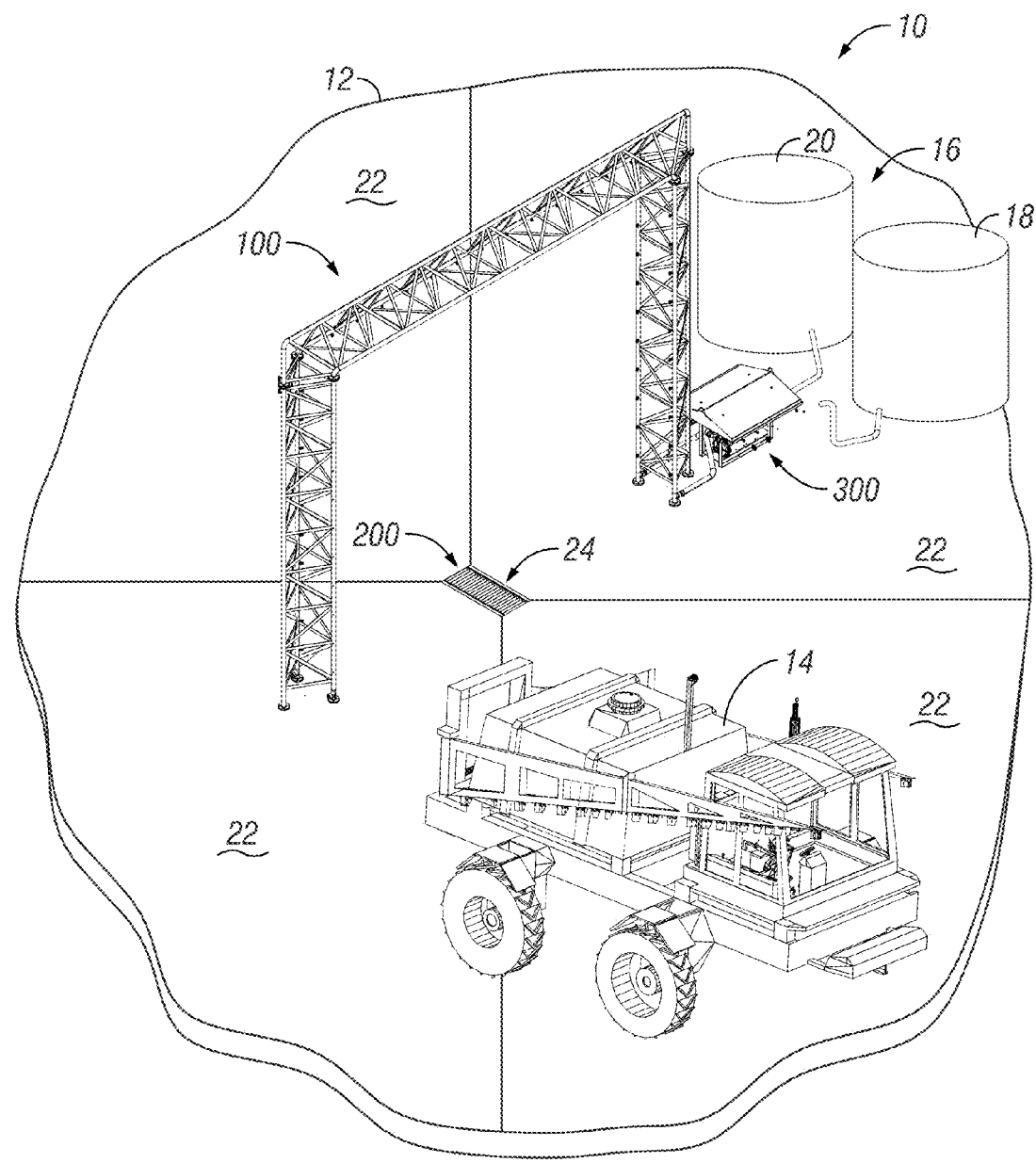
FIG. 1 is a perspective view of a washing and loading station for chemical application equipment in accordance with an illustrative embodiment.

FIG. 1 illustrates an exemplary washing and loading station 10 for chemical application equipment. The station 10 is capable of hosting a cleaning process and a chemical fill process in the same location. The station 10 may include a loading pad 12 on which to position a vehicle 14 during the cleaning process and/or the chemical fill process. In many instances the vehicle is chemical application equipment such as row-crop sprayers, floater sprayers, and ultra-low volume (ULV) or very low volume (VLV) sprayers.

A chemical fill station 16 is associated with the chemical fill process. The chemical fill station 16 may include one or more reservoirs 18 for storing and dispensing one or more chemicals. The chemicals may include, but are not limited to, pesticides, herbicides, insecticides, nematicides, polymers, pigments, surfactants, fertilizers, micronutrients, coatings, and colorants. The chemicals may be dispensed to the chemical application equipment 14 through any metering device commonly known in the art such as hoses, tubes, nozzles, dispensers, and the like.

The station 10 includes a liquid reservoir 20 supplying liquid to a vehicle washing apparatus 100. In a preferred embodiment, the liquid is water, but the present disclosure contemplates the use of other liquids in the cleaning process, including cleaning agents and water-cleaning agent solutions.

In an exemplary embodiment, the vehicle washing apparatus 100 is disposed on the loading pad 14. Furthermore, the vehicle 14 is positioned on the loading pad 12 during the chemical fill process and the washing process. The loading pad 12 may comprise one or more sloped surfaces 22 to channel the following to a sump 24 during the chemical fill process and/or the washing process: excess chemical runoff, chemical residue runoff, and excess water runoff. In the illustrated embodiment of FIG. 1, the sump 24 is centrally disposed between four sloped surfaces 22. The present disclosure contemplates any number of sloped surfaces and/or multiple sumps without deviating from the objects of the disclosure. The station 10 may be configured to recycle product(s) received by sump 24 by creating a closed fluid circuit. The station 10 may also be configured to filter chemicals received by the sump 24 and store the chemicals in an appropriate receptacle.

In a preferred embodiment, the vehicle washing apparatus 100 receives liquid from the reservoir 20. The vehicle washing apparatus 100 is powered by components contained within a motor-pump shed 300 discussed in detail below. An undercarriage washing apparatus 200 may also be associated with the vehicle washing apparatus 100 and in fluid communication with the reservoir 20. The undercarriage apparatus 200 is configured to apply liquid from the reservoir 20 to an underside of the vehicle 14. In the instance of chemical application equipment, the undercarriage apparatus 200 may primary rinse the wheel wells and insides of the sprayer arms. Due to the presence of important wiring harnesses proximate to the underside of the of chemical application equipment, care is taken not to supply excess liquid to the underside.

In the illustrated embodiment of FIG. 1, the undercarriage washing apparatus 200 also comprises the sump 24. In another exemplary embodiment, the undercarriage washing apparatus 200 and the sump 24 may be separate structures. The structures may be proximate to or at a distance from one another. In preferred embodiments, however, the sump 24 is associated with the one or more sloped surfaces 22 and the undercarriage washing apparatus 200 will be aligned with the vehicle washing apparatus 100.

Figure 2A:
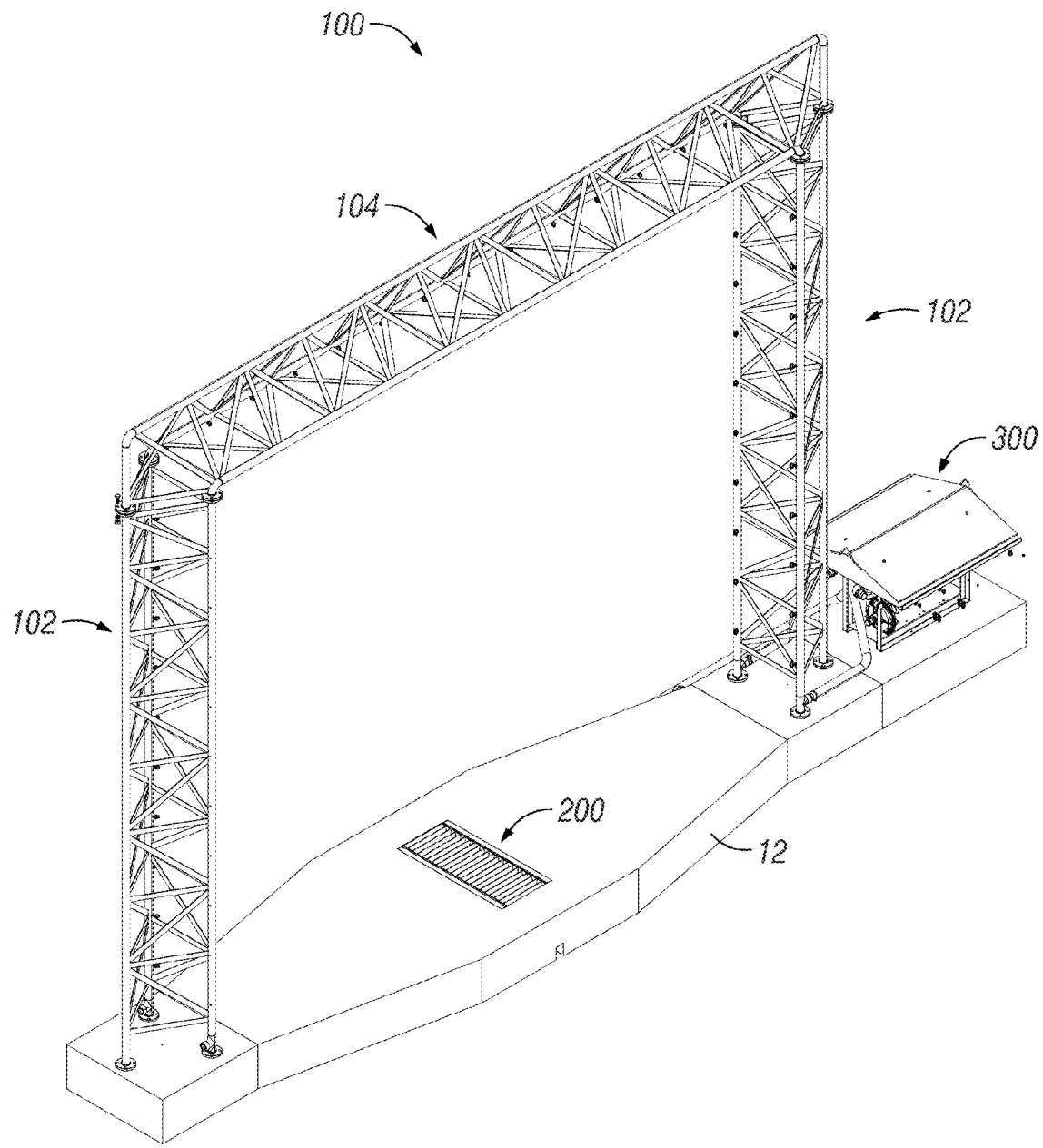
FIG. 2A is an isometric view of a vehicle washing apparatus in accordance with an illustrative embodiment.

Referring to FIGS. 2A and 2B, the vehicle washing apparatus 100 includes a plurality of upright towers 102 extending upwardly from the loading pad 12. A horizontal tower 104 is connected to the plurality of upright towers 102. In the illustrated embodiment of FIGS. 2A and 2B, the vehicle washing apparatus comprises two upright towers 102 connected by one horizontal tower 104. The present disclosure contemplates any number of upright towers and/or horizontal towers may be employed without deviating from the objects of the disclosure.

Figure 3A:
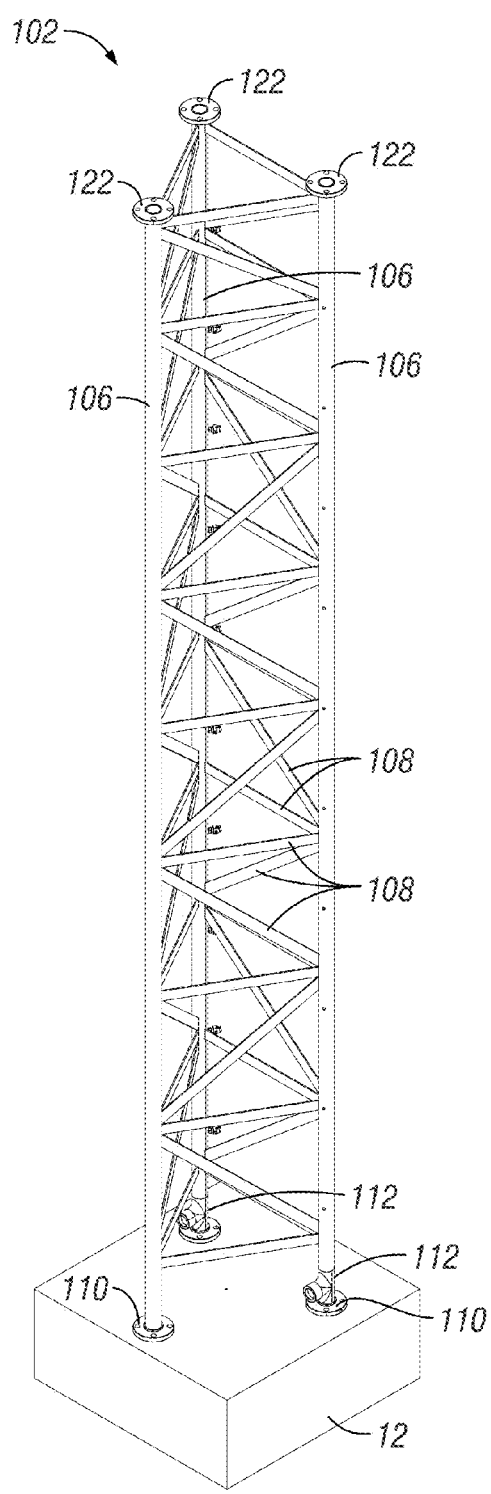
FIG. 3A is an isometric view of an upright tower in accordance with an illustrative embodiment.
Figure 3B:
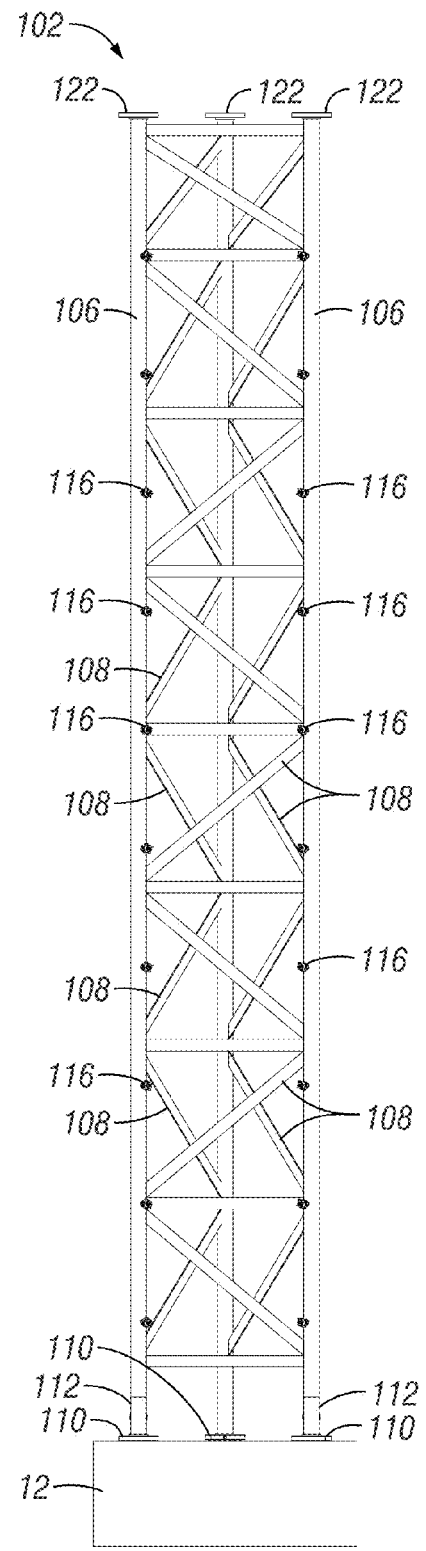
FIG. 3B is a front elevation view of an upright tower in accordance with an illustrative embodiment.
Figure 3C:
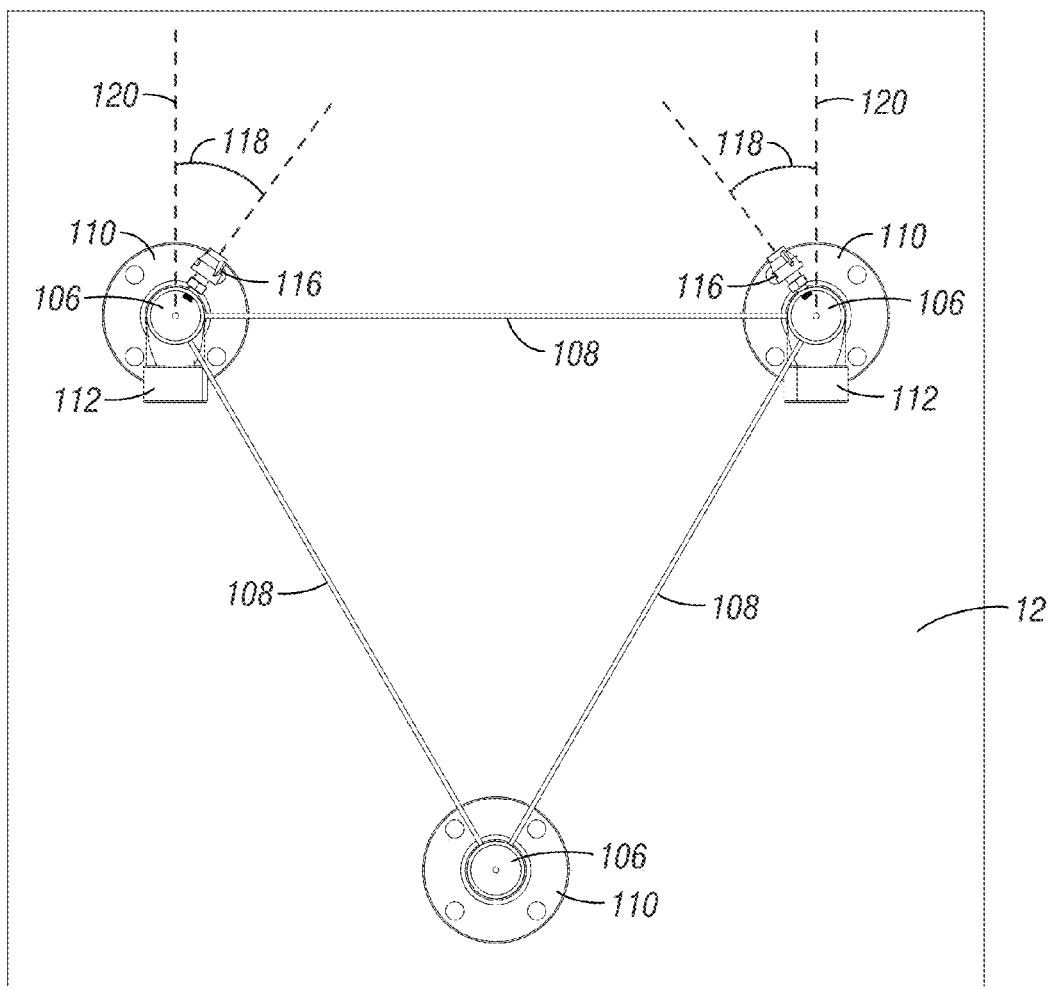
FIG. 3C is a top plan view of an upright tower in accordance with an illustrative embodiment.

An exemplary upright tower 102 is illustrated in FIGS. 3A, 3B and 3C. The upright tower 102 is comprised of a plurality of vertical members 106. The plurality of vertical members 106 may be secured to the loading pad 12 through any means commonly known in the art. In an exemplary embodiment, flanges 110, and more particularly stainless steel flanges, are welded to an end of the plurality of vertical members 106 and secured to the loading pad 12. The plurality of vertical members 106 may be connected to one another by a plurality of horizontal and diagonal braces 108. The braces 108, together with the plurality of vertical members 106, form a truss and the structural backbone of the vehicle washing station 100. Due to the exposure of the vehicle washing station 100 to liquid, including water and/or chemicals, the plurality of vertical members 106 may be comprised of stainless steel pipe. In an exemplary embodiment, the plurality of vertical members 106 are comprised of schedule ten stainless steel pipe (T-304/304L) with a two-inch inner diameter, and the braces 108 are comprised of flat iron with a width and thickness of 1¾" and ¼", respectively.

In an exemplary embodiment illustrated in FIG. 3C, three vertical members 106 associated with one of the upright towers 102 are arranged in an equilateral triangular configuration. In such a configuration, an angle between the horizontal braces 108 is sixty degrees. Any number of vertical members 106 may be used without deviating from the objects of the present disclosure. For example, two vertical members 106 may comprise the upright tower 102. In another exemplary embodiment, four vertical members 106 may be arranged in a square or rectangle. In still another exemplary embodiment, five vertical members 106 may be arranged in a pentagon. Furthermore, the distance(s) between the vertical members 106 may be based on the needs of the application. In an exemplary embodiment, center points of the vertical members 106 are approximately two feet apart.

At least two of the plurality of vertical members 106 of each of the upright towers 102 are configured to be fluid conduits. In other words, fluid is fed within the pipes that comprise the vertical members. As a result, the essential load-bearing members are simultaneously operating as components of the fluid delivery system, resulting in simplified complexity of the structure and reduced number of components. To achieve the advantageous design, fluid couplers 112 are connected at a base of each of the vertical members 106 configured to be fluid conduits, as shown illustratively in FIGS. 3A and 3B. The fluid couplers 112 are connected to the pump contained with the motor-pump shed 300 by tower pump hoses 302, as shown illustratively in FIG. 2B. In the illustrated embodiment of FIGS. 2B and 3A, two of the three vertical members 106 are fluid conduits having a fluid coupler 112. The present disclosure contemplates any number of the vertical members may comprise fluid conduits. Furthermore, for improved modularity, any one or more of the fluid couplers 112 may be selectively capped. For example, FIG. 2B illustrates two of the fluid couplers 112 associated with the upright tower 102 proximate to the motor-pump shed 300 are fluidly connected to the pump, whereas the fluid couplers 112 associated with the opposite upright tower 102 are capped. Such a capping of the fluid couplers 112 opposite the machine-pump shed may be necessary to maintain the appropriate pressure characteristics of the system. Yet having matching fluid couplers 112 on each of the upright towers is an advantageous design that permits each of the upright towers 102 to be interchangeable. In other words, the upright towers 102, as shown in the illustrative embodiment of FIGS. 2A and 2B, have the same structural configuration, which reduces component costs, manufacturing time and costs, repair time and costs, and the like.

The plurality of upright towers 102 includes a plurality of nozzles 116. In particular, the plurality of nozzles 116 is disposed along a length of one or more of the plurality of vertical members 106 configured to be fluid conduits. The nozzles 116 may be connected to the vertical members 106 through any means commonly known in the art, including threading, brazing, welding, friction fit, detent pins, and the like. In an exemplary embodiment, the nozzles 116 are threaded into ¼" National Pipe Thread (NPT) holes tapped into the vertical members 106. The distance between the nozzles 116 may be consistent or varied, or of any spacing without deviating from the objects of the disclosure. In an exemplary embodiment, the nozzles 116 are twenty-four inches apart. In another exemplary embodiment, the nozzles 116 are twenty-four inches apart and staggered between the vertical members 106, resulting in an effective vertical spacing of twelve inches. In still another exemplary embodiment, the nozzles 116 are twelve inches apart. Further, the number of nozzles 116 may vary without deviating from the objects of the disclosure. In an exemplary embodiment, each of the upright towers 102 has ten pairs of nozzles, or a total of twenty nozzles.

Figure 7A:
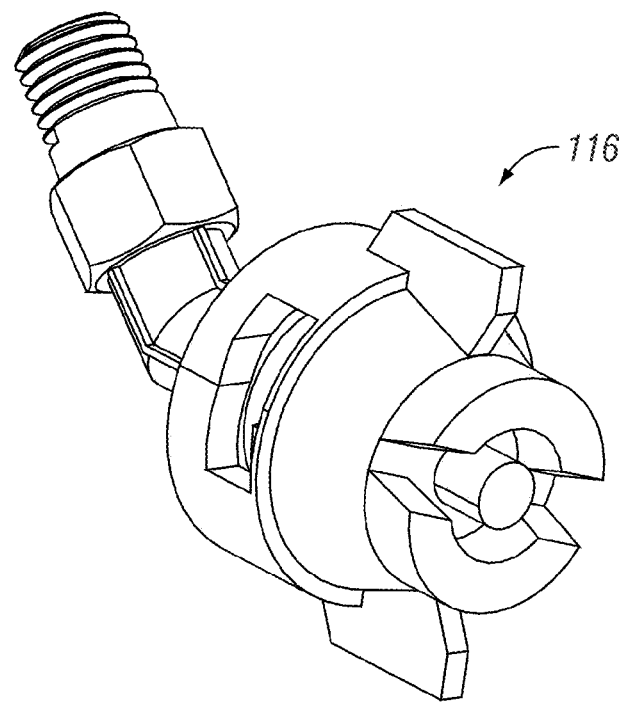
FIG. 7A is a front perspective view of a nozzle in accordance with an illustrative embodiment.
Figure 7B:
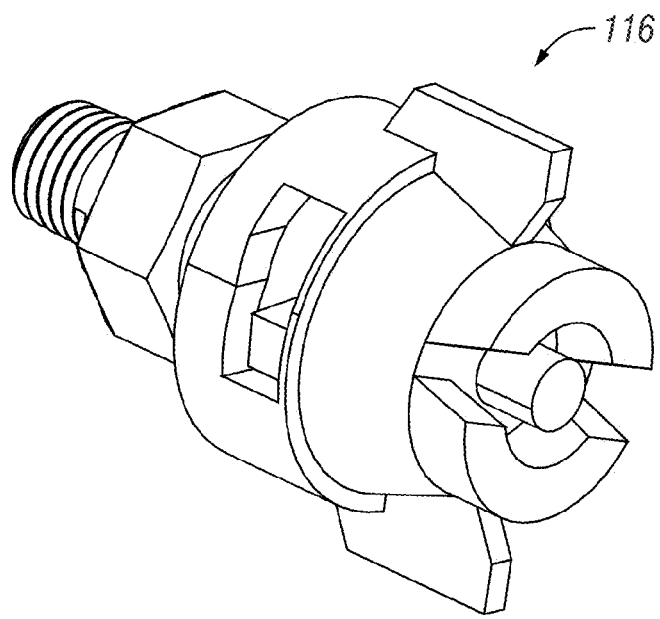
FIG. 7B is a front perspective view of a nozzle in accordance with an illustrative embodiment.

The plurality of nozzles 116 is configured to receive liquid from the vertical members 106 and spray the liquid at high pressure at the vehicle 14. In an exemplary embodiment, each of the nozzles 116 discharges two gallons per minute at one hundred to one-hundred fifty pounds per square inch (PSI) of pressure. The nozzles 116 discharge liquid with sufficient pressure to remove residue from the vehicle 14. FIG. 7A illustrates an exemplary nozzle 116 with an angle between the input and output of one-hundred thirty-five degrees. FIG. 7B illustrates another exemplary nozzle with an angle between the input and output of one-hundred eighty degrees. The present disclosure is not limited to the nozzle angles expressed herein. Furthermore, any combination of nozzles 116, including but not limited to those illustrated in FIGS. 7A and 7B, may be installed linearly along the length of one or more of the vertical members 106 and/or one or more of the horizontal members 124.

Referring to FIG. 3C, the plurality of nozzles 116 may be oriented inwardly to create an intersecting spray pattern. In particular, nozzles 116 associated with one of the vertical members 106 associated may be oriented inwardly at an acute angle 118 from an axis 120 extending horizontally between one of the vertical members of one upright tower 102 and a companion vertical member of the other upright tower 102. In an exemplary embodiment, the angle 118 is between thirty and forty degrees. In another exemplary embodiment, the angle 118 is thirty-five degrees. The intersecting spray pattern is advantageous and assists in efficient removal of chemical residue and other debris from the vehicle 14.

As previously expressed herein, the horizontal tower 104 is connected to the plurality of upright towers 102. The horizontal tower 104 has flanges 120 sized and shaped to connect to flanges 122 associated with the upright towers 102. The means for connection advantageously provides for ease of disassembly and assembly. Other means for connection are envisioned, including quick-release latches, welding, clamping, and the like.

In many respects the structure, components and function of the horizontal tower 104 are similar to that of the upright towers 102. The horizontal tower 104 is comprised of a plurality of horizontal members 124. The horizontal members 124 may be reinforced by horizontal and diagonal braces 126. In an exemplary embodiment, the plurality of horizontal members 106 are comprised of schedule ten stainless steel pipe (T-304/304L) with a two-inch inner diameter, and the braces 108 are comprised of flat iron with a width and thickness of 1¾" and ¼", respectively.

Figure 4A:
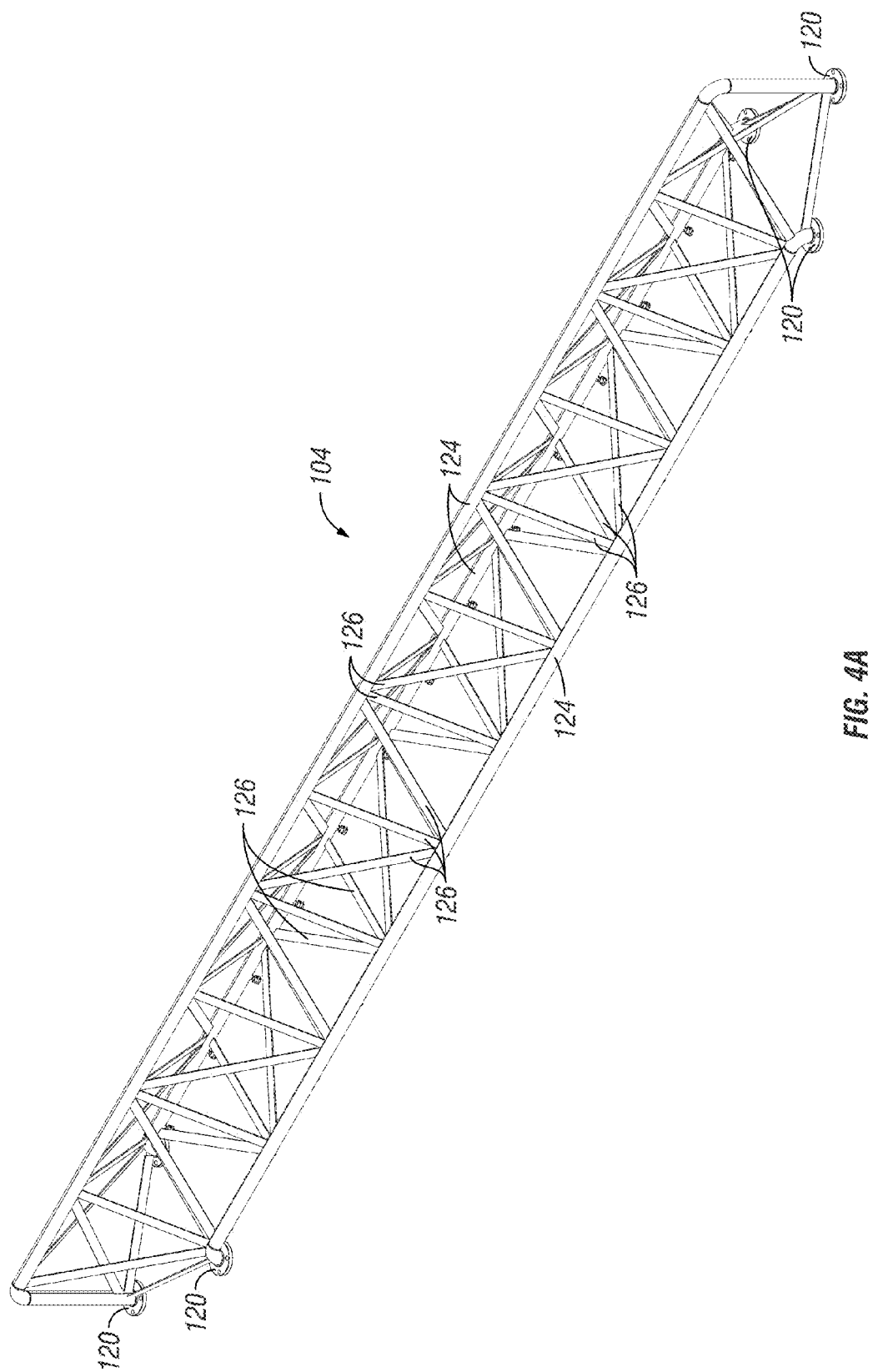
FIG. 4A is an isometric view of a horizontal section in accordance with an illustrative embodiment.
Figure 4B:
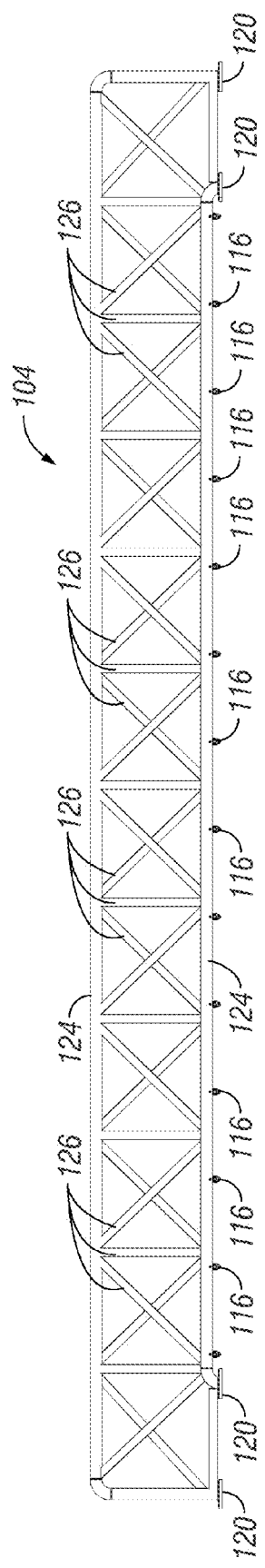
FIG. 4B is a front elevation view of a horizontal section in accordance with an illustrative embodiment.
Figure 4C:
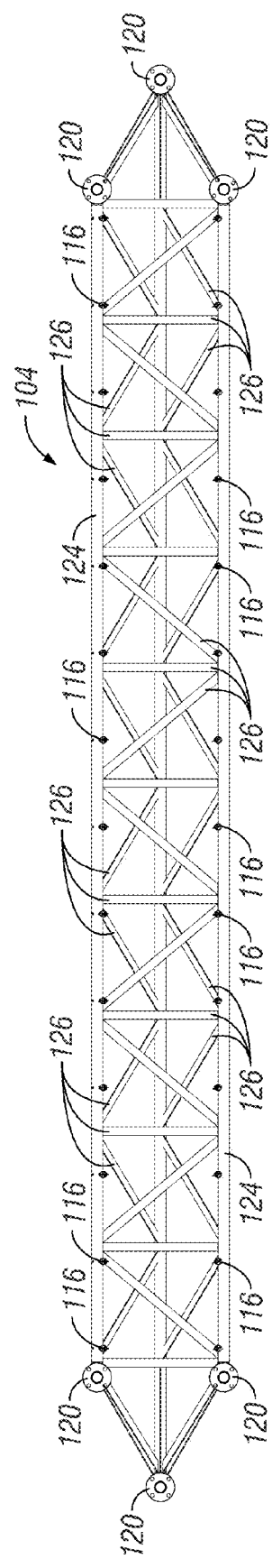
FIG. 4C is a bottom plan view of a horizontal section in accordance with an illustrative embodiment.
Figure 4D:
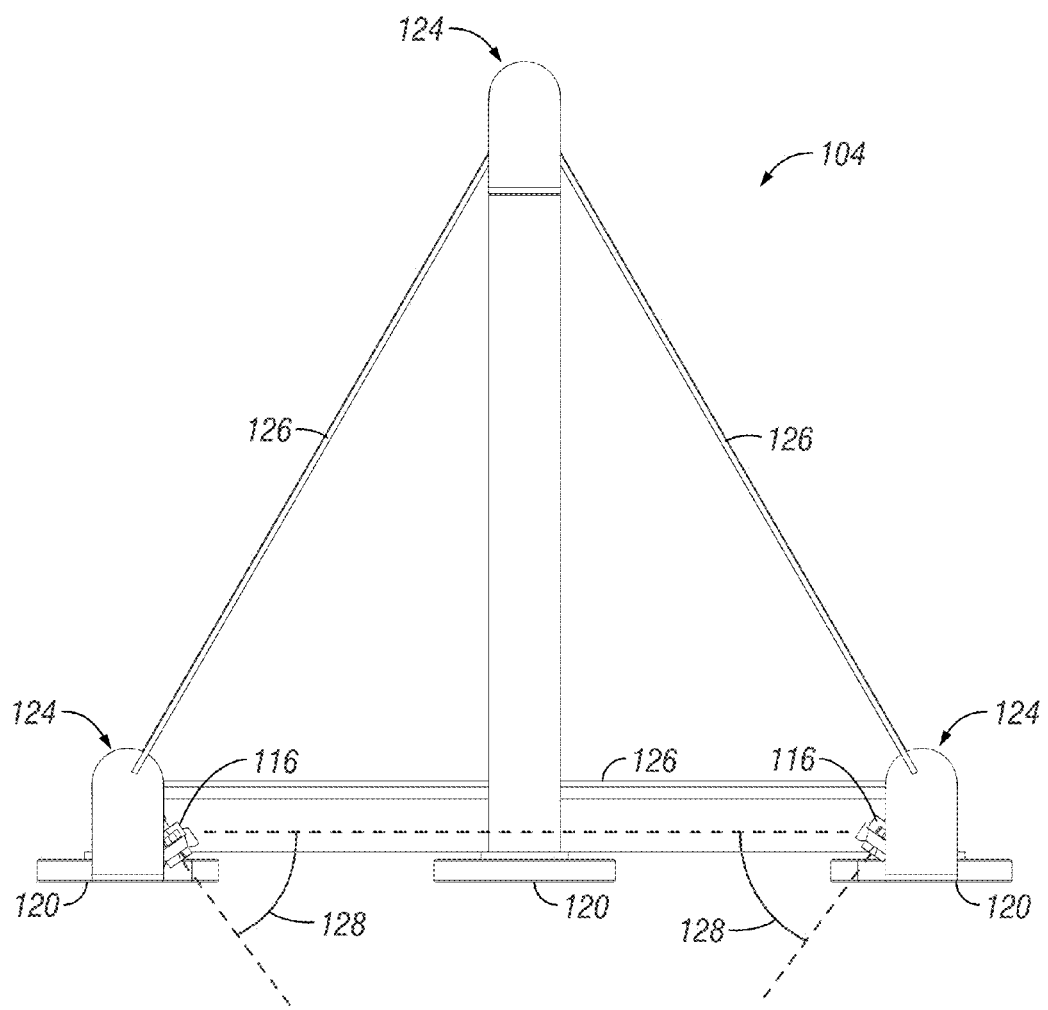
FIG. 4D is a side elevation view of a horizontal section in accordance with an illustrative embodiment.

In an exemplary embodiment illustrated in FIG. 4D, three horizontal members 124 associated with the horizontal tower 104 are arranged in an equilateral triangular configuration. Any number of horizontal members 124 may be used without deviating from the objects of the present disclosure. In general, the number of horizontal members 126 will correspond to the number of vertical members 106; in an exemplary embodiment, each of the horizontal members 124 is connected to one of the vertical members 106.

At least two of the plurality of horizontal members 124 of the horizontal tower 104 are configured to be fluid conduits. In a preferred embodiment, the horizontal members 124 configured to be fluid conduits are connected to vertical members 106 configured to be fluid conduits. For example, in the illustrated embodiment of FIG. 2A, two parallel fluid circuits are created by two vertical members 106 of each of the upright towers 102 and two of the horizontal members 124 of the horizontal tower 104.

The horizontal tower 104 includes a plurality of nozzles 116. In particular, the plurality of nozzles 116 is disposed along a length of one or more of the horizontal members 124 configured to be fluid conduits. The nozzles 116 may be connected to the horizontal members 124 through any means commonly known in the art, including threading, brazing, welding, friction fit, detent pins, and the like. In an exemplary embodiment, the nozzles 116 are threaded into ¼" NPT holes tapped into the horizontal members 124. The distance between the nozzles 116 may be consistent or varied, or of any spacing without deviating from the objects of the disclosure. In an exemplary embodiment, the nozzles 116 are twenty-four inches apart. In another exemplary embodiment, the nozzles 116 are twenty-four inches apart and staggered between the horizontal members 124, resulting in an effective vertical spacing of twelve inches. In still another exemplary embodiment, the nozzles 116 are twelve inches apart. Further, the number of nozzles 116 may vary without deviating from the objects of the disclosure. In an exemplary embodiment, the horizontal tower has thirteen pairs of nozzles, or a total of twenty-six nozzles.

The plurality of nozzles 116 is configured to receive liquid from the horizontal members 124 and spray the liquid at high pressure at a top of the vehicle 14. Referring to FIG. 4D, the plurality of nozzles 116 may be oriented inwardly to create an intersecting spray pattern. In particular, nozzles 116 associated with one of the horizontal members 124 associated may be oriented downwardly and inwardly at an acute angle 128 relative to horizontal. In an exemplary embodiment, the angle 128 is between thirty and forty degrees. In another exemplary embodiment, the angle 128 is thirty-five degrees. The intersecting spray pattern is advantageous and assists in efficient removal of chemical residue and other debris from the top of the vehicle 14.

Figure 5A:
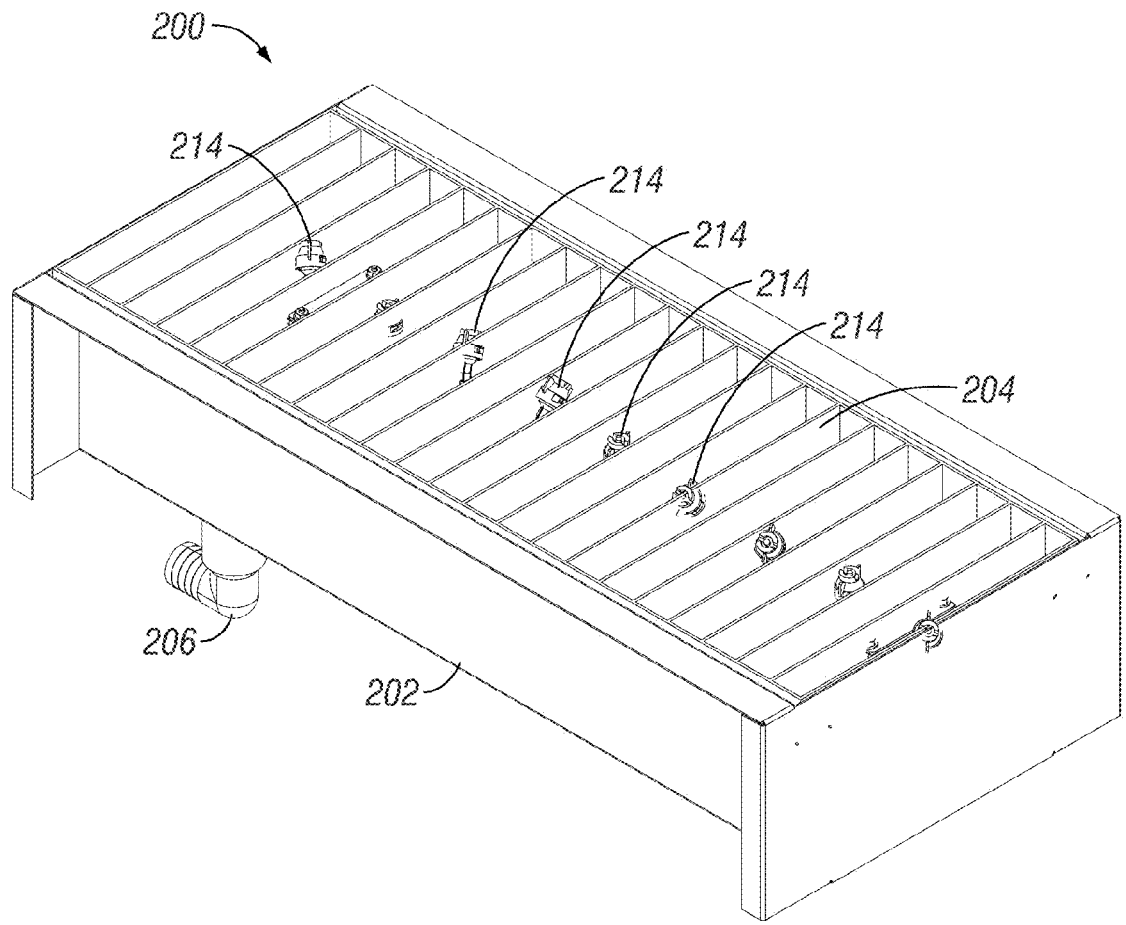
FIG. 5A is a front perspective view of an undercarriage washing apparatus in accordance with an illustrative embodiment.
Figure 5B:
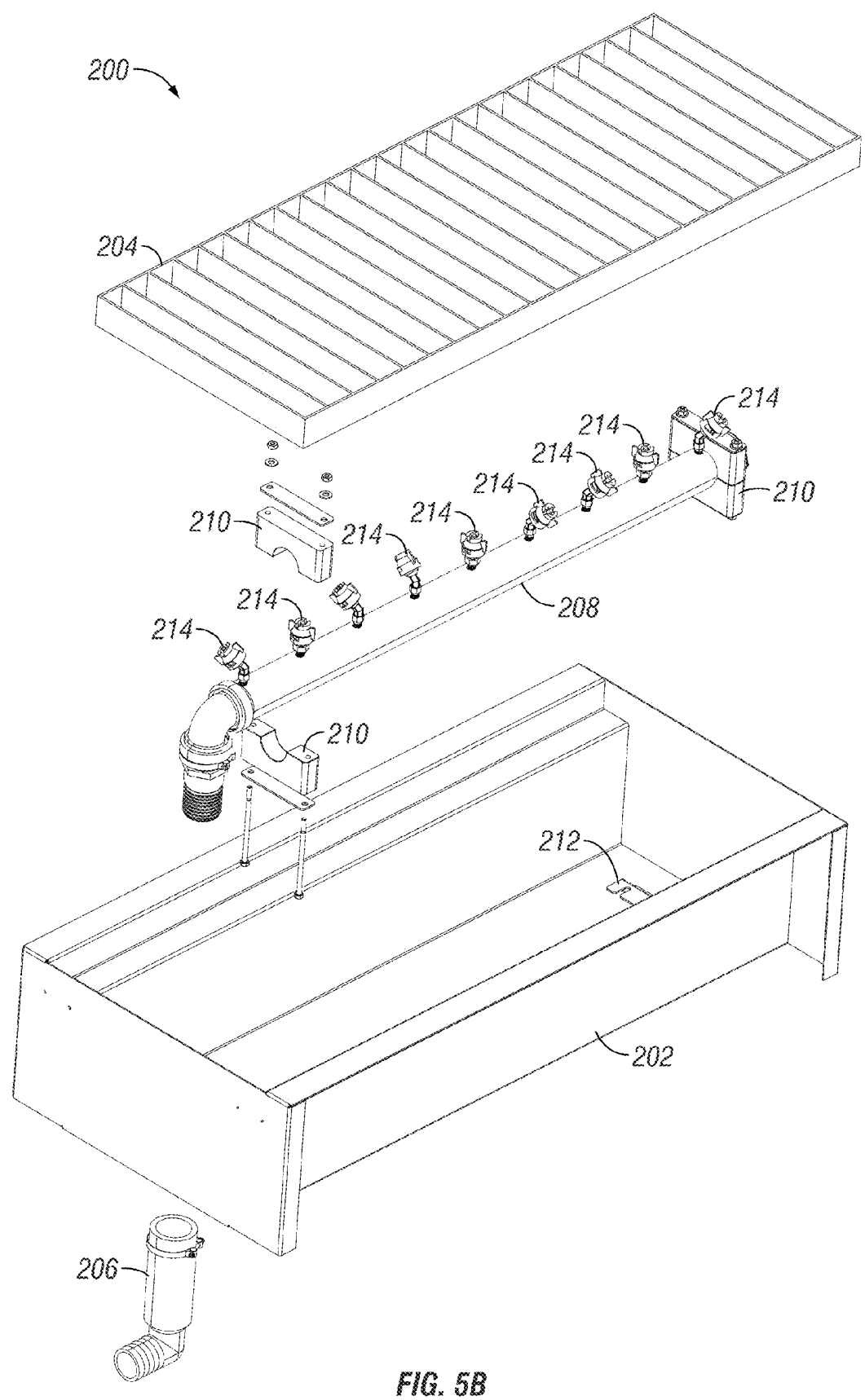
FIG. 5B is an exploded view of an undercarriage washing apparatus in accordance with an illustrative embodiment.

To remove chemical residue and debris from the underside of the vehicle 14, the vehicle washing apparatus 100 may include an undercarriage washing apparatus 200, as shown illustratively in FIGS. 5A and 5B. The undercarriage washing apparatus 200 is fluidly connected to the motor-pump shed 200 by a feed hose 304. The feed hose 304 may be disposed below the loading pad 12 or any other suitable position so as not to be comprised during operation of the station 10, and more particularly, when a vehicle 14 drives across the loading pad 22 of the station 10.

The undercarriage washing apparatus 200 includes a sump 202 covered by a grate 204. The grate 204 protects the contents of the undercarriage washing apparatus 200 if a vehicle 14 drives over the same. The liquid enters the undercarriage washing apparatus 200 through an inlet pipe 206 in fluid connection with the feed hose 304. A curvilinear main pipe 208 is disposed within the sump 202 in fluid connection with the inlet pipe 206. The main pipe 208 is generally elongated and spans the length of the sump 202. The main pipe 208 is disposed at a distance from a base of the sump 202, so as to provide clearance for water and/or chemical residue to be collected in the sump 202 without interfering with the operation of the undercarriage washing apparatus 200. The separation may be provided by one or more braces 210 disposed on one or more flanges 212 extending upwardly from the base of the sump 202.

A plurality of nozzles 214 may be connected to the main pipe 208. The plurality of nozzles 214 may be arranged along the length of the main pipe 208, so as to maximize area of coverage along the length of the vehicle 14. The present disclosure contemplates any number and/or combination of nozzles 214 without deviating from the objects of the present disclosure. For example, in the illustrated embodiment of FIG. 5B, the plurality of nozzles 214 is comprised of three nozzles illustrated in FIG. 7B interspersed within five nozzles illustrated in FIG. 7A. The nozzles 214 may be spaced at any distance, but generally the spacing will be codependent with the grate 204 to avoid the grate 204 interfering with the spray pattern.

Each of the upright towers 102, the horizontal tower 104, the undercarriage washing apparatus 200, and/or the plurality of nozzles 116 and 214 may be associated with a plurality of valves (not shown). The plurality of valves may be any type of valves commonly known in the art to permit and prevent flow of a liquid through a nozzle. The plurality of valves may be operatively connected to a control system. The control system may provide section control (i.e., control of flow into each of the upright towers 102, the horizontal tower 104, and/or the undercarriage washing apparatus 200), or individual control over each of the plurality of nozzles 116 and 214. The control system may be based on, at least in part, a number of conditions including the size of the vehicle, shape of the vehicle, dirtiness of vehicle, pressure requirements, and/or flow rate requirements. For example, while chemical application equipment may comprise the most common vehicle for use in the vehicle washing apparatus, requiring a particular set of operating parameters, the present disclosure, contemplates any type of vehicle 14, including but not limited to tractors, automobiles, tractors, planters, and the like, which may require a different set of operating parameters.

Figure 6B:
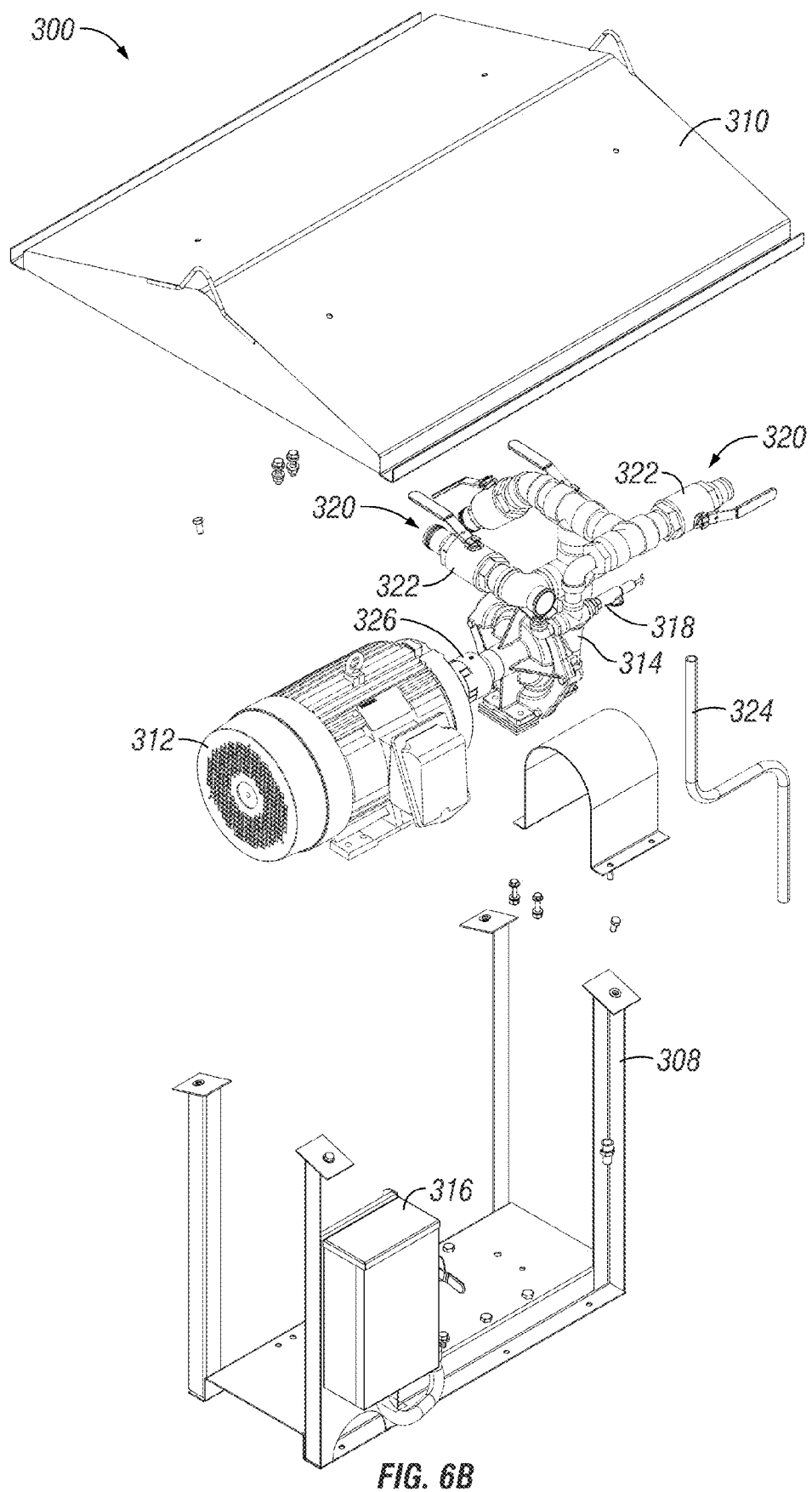
FIG. 6B is an exploded view of a motor-pump shed in accordance with an illustrative embodiment.

Referring to FIGS. 6A and 6B, a motor-pump shed 300 of an exemplary embodiment is illustrated. The motor-pump shed 300 may be comprised of a housing 306 having a base 308 connected to a roof 310. The housing 306 assists in keeping the electromechanical drive components of the system as dry as possible during operation of the vehicle washing apparatus 100.

To appropriately power to the system, the motor 312 may require twenty horsepower operating at 3,500 revolutions per minute. In an exemplary embodiment, the motor 312 is a Toshiba 0202DSR41A-D. Furthermore, the motor 312 may comprise a three-phase motor for efficient power supply. A switch 316 may be electrically connected to the motor 312. For example, the switch 316 may be a Schneider Electric Model No. HU363AWK supplying up to one hundred amperes of current.

A pump 314 is operatively connected to the motor 312. The pump 314 may be connected to the motor 312 with a coupler 326 (e.g., LoveJoy coupler). As previously expressed herein, the system may require a flow rate of one hundred fifty gallons per minute. However, many pumps capable of pumping at least one hundred fifty gallons per minute are associated with sudden drops in pressure. In an exemplary embodiment, the pump 314 is Hy-Pro Centrifugal Pump Model No. 9205C capable of pumping one hundred eighty gallons per minute at one hundred forty PSI. For safety, a relief valve 318 and hose 324 may be associated with the pump 314.

The pump 314 may be associated with one or more outlets 320. In an exemplary embodiment, the pump 314 is comprised of three outlets 320, two of which are in fluid connection with the tower pump hoses 302 of one upright tower 102 and the third in fluid connection with the feed hose 304 of the undercarriage washing apparatus 200. A quick-release coupler 322 may be associated with each of the outlets 320 and the tower pump hoses 302.

In operation, a vehicle 14 may be positioned on the loading pad 12. A chemical fill process may occur and be comprised of filling the chemical application equipment with chemical product from the chemical reservoir 18. Any excess chemical product will be channeled to a sump 24 by one or more of sloped surfaces 22 associated with the loading pad 12.

The vehicle may 14 may then enter the vehicle washing apparatus 100 associated with the loading pad 12. Power is supplied to the motor 312 to operate the pump 314. Liquid, most often water, is pulled from a reservoir 20 and pressurized by the pump 314. The liquid is fed through the tower pump hoses 302 associated with the upright tower 102 proximate to the machine-pump shed 300. The liquid travels within at least two of the vertical members 106 acting as liquid conduits, then within at least two the horizontal members 124 of the horizontal tower 104 acting as liquid conduits, and then to at least two of the verticals members 106 of the other upright tower 102 acting as liquid conduits. A plurality of nozzles 116 disposed on the vertical members 106 and the horizontal members 124 acting as liquid conduits disperse the liquid to the sides and top of the vehicle 14, respectively. A control system may provide section control or individual control of a plurality of valves associated with the plurality of nozzles 116. Excess water and chemical residue are collected in the sump 24 that may be associated with the loading pad 12.

In concurrent operation, the pump 314 may supply pressurized liquid from the reservoir 20 to the undercarriage washing apparatus 200 through the feed hose 304. A plurality of nozzles 214 disposed within the undercarriage washing apparatus 200 may disperse the liquid to the underside of the vehicle 14. Excess water and chemical residue are collected in the sump 24 that may be disposed within the loading pad 12. The station 10 may filter the chemical residue from the liquid and/or recycle the chemical residue and the liquid.

The disclosure is not to be limited to the particular embodiments described herein. In particular, the disclosure contemplates numerous variations in the type of ways in which embodiments of the disclosure can remove undesirable residue from a vehicle that requires less time and labor and minimizes undesirable user and environmental exposure to chemicals. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the disclosure. It is understood that any other modifications, substitutions, and/or additions can be made, which are within the intended spirit and scope of the disclosure. For the foregoing, it can be seen that the disclosure accomplishes at least all that is intended.

The previous detailed description is of a small number of embodiments for implementing the disclosure and is not intended to be limiting in scope. The following claims set forth a number of the embodiments of the disclosure with greater particularity.

What is claimed is:

1. A system for washing an agricultural vehicle, the system comprising:
   a loading pad on which to position the agricultural vehicle during a cleaning process and a chemical fill process;
   a chemical fill station associated with the loading pad comprising a reservoir for storing and dispensing one or more chemicals to the agricultural vehicle during the chemical fill process; and
   a spray washing apparatus disposed on the loading pad and configured to supply water from a water reservoir to the agricultural vehicle during the cleaning process, the spray washing apparatus comprising:
   (a) a first upright tower section having a plurality of rigid elongated tubular members providing structural support therefor and a second upright tower section having a plurality of rigid elongated tubular members providing structural support therefor;
   (b) a horizontal section connecting the first upright tower section and the second upright tower section, the horizontal section having a plurality of rigid elongated tubular members;
   (c) a plurality of nozzles disposed on at least two of the plurality of rigid elongated tubular members of the first upright tower section, at least two of the plurality of rigid elongated tubular members of the second upright tower section and at least two of the plurality of rigid elongated tubular members of the horizontal section;
   (d) wherein the plurality of nozzles is in fluid connection with a liquid reservoir; and
   (e) wherein the at least two of the plurality of rigid elongated tubular members of the first upright tower section, the second upright tower section, and the horizontal section are configured to be conduits of liquid and to supply liquid from the liquid reservoir to the plurality of nozzles.

2. The system of claim 1 wherein the loading pad further comprises:
   (a) one or more sloped surfaces; and
   (b) a sump associated with at least one of the one or more sloped surfaces;
wherein the sump of the loading pad is configured to receive excess chemical from the chemical fill process, receive runoff chemical residue from the cleaning process, and receive excess water from the cleaning process.

3. The system of claim 1, further comprising:
   an undercarriage washing apparatus in fluid connection with the water reservoir and configured to supply water from the water reservoir to an underside of the agricultural vehicle.

4. The system of claim 1 wherein the plurality of nozzles are arranged linearly along a length of the plurality of rigid elongated tubular members of each of the first upright tower section and the second upright tower section.

5. The system of claim 4 wherein the plurality of nozzles further comprises:

(a) a first plurality of nozzles disposed on the first upright tower section; and
(b) a second plurality of nozzles disposed on the second upright tower section;

wherein the first plurality of the nozzles and the second plurality of the nozzles are positioned to create an intersecting spray pattern.

6. The system of claim 1 wherein the plurality of nozzles associated with each of the following is independently controllable by a control unit:
(a) each of the first upright tower section and the second upright tower section; and
(b) the horizontal section.

7. A vehicle washing apparatus comprising:
a first upright tower section and a second upright tower section, each of the first upright tower section and the second upright tower section having a plurality of rigid elongated tubular members providing structural support therefor;
a horizontal section connecting the first upright tower section and the second upright tower section, the horizontal section having a plurality of rigid elongated tubular members;
a plurality of nozzles disposed on at least two of the plurality of rigid elongated tubular members of the first upright tower section, at least two of the plurality of rigid elongated tubular members of the second upright tower section, and at least two of the plurality of rigid elongated tubular members of the horizontal section; and
an undercarriage washer disposed proximate to ground between the first upright tower section and the second upright tower section, the undercarriage washer comprising:
(a) a support compartment;
(b) a plurality of undercarriage nozzles disposed within the support compartment;
wherein the plurality of nozzles and the plurality of undercarriage nozzles are in fluid connection with a liquid reservoir; and
wherein the at least two of the plurality of rigid elongated tubular members of the first upright tower section, the second upright tower section, and the horizontal section are configured to be conduits of liquid and to supply liquid from the liquid reservoir to the plurality of nozzles.

8. The vehicle washing apparatus of claim 7 wherein the at least two of the plurality of elongated tubular members of the first upright tower section configured to be conduits of liquid are connected to the at least two of the plurality of elongated tubular members of the horizontal section configured to be conduits of liquid, and further wherein the at least two of the plurality of elongated tubular members of the second upright tower section configured to be conduits of liquid are connected to the at least two of the plurality of elongated tubular members of the horizontal section configured to be conduits of liquid.

9. The vehicle washing apparatus of claim 7 wherein the plurality of nozzles disposed on the at least two of the plurality of elongated tubular members of the first upright tower section further comprises:
(a) a first plurality of nozzles disposed on one of the at least two of the plurality of rigid elongated tubular members; and
(b) a second plurality of nozzles disposed on another one of the at least two of the plurality of rigid elongated tubular members;

wherein the first plurality of nozzles and the second plurality of nozzles are arranged to discharge the liquid in an intersecting spray pattern.

10. The vehicle washing apparatus of claim 9 wherein the first plurality of nozzles is arranged along a length of the one of the at least two of the plurality of rigid elongated tubular members, and further wherein the second plurality of nozzles is arranged along a length of the another one of the at least two of the plurality of rigid elongated tubular members.

11. The vehicle washing apparatus of claim 7 wherein the plurality of nozzles are oriented between thirty and forty degrees from an axis extending horizontally between one of the plurality of rigid elongated tubular members of the first upright tower section and one of the plurality of rigid elongated tubular members of the second upright tower section; and wherein the plurality of nozzles apply the liquid to a vehicle with sufficient pressure to remove residue from the vehicle.

12. The vehicle washing apparatus of claim 7, further comprising:
a plurality of valves, each of the plurality of valves connected to one of the plurality of nozzles; and
a control system operably connected to the plurality of valves.

13. The vehicle washing apparatus of claim 12 wherein the control system is configured to control one of the following:
(a) a section of the plurality of valves; and
(b) each of the plurality of valves.

14. The vehicle washing apparatus of claim 7 wherein the horizontal section is detachable from the first upright tower section, and further wherein the horizontal section is detachable from the second upright tower section.

15. The apparatus of claim 7 wherein the first tower section and the second tower section are interchangeable.

16. A vehicle washing apparatus comprising:
a first upright tower section and a second upright tower section, each of the first upright tower section and the second upright tower section having a plurality of pipes providing structural support therefor and a plurality of horizontal and diagonal braces operatively connected to the pipes;
a horizontal section connecting the first upright tower section and the second upright tower section, the horizontal section having a plurality of pipes; and
a plurality of nozzles disposed on at least two of the pipes of the first upright tower section, at least two of the plurality of pipes of the second upright tower section, and at least two of the plurality of pipes of the horizontal section; wherein the plurality of nozzles is in fluid connection with a liquid reservoir; and
wherein the at least two of the plurality of pipes of the first upright tower section, the second upright tower section, and the horizontal section are configured to be conduits of liquid and to supply liquid from the liquid reservoir to the plurality of nozzles.

* * * * *